Oct. 11, 1960 P. S. MORGAN 2,955,509
REFLECTOR FOR PRAXINOSCOPIC DEVICES
Filed April 19, 1956 4 Sheets-Sheet 1

INVENTOR.
Porter S. Morgan
BY
Johnson and Kline
ATTORNEYS

Oct. 11, 1960 P. S. MORGAN 2,955,509
REFLECTOR FOR PRAXINOSCOPIC DEVICES
Filed April 19, 1956 4 Sheets-Sheet 2
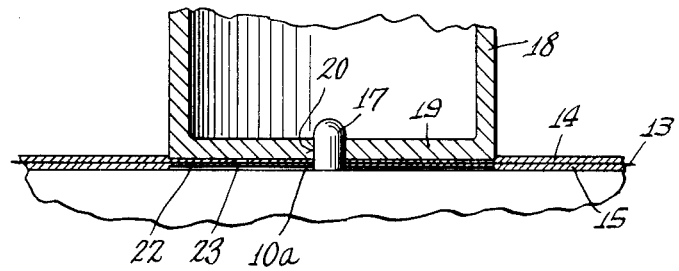
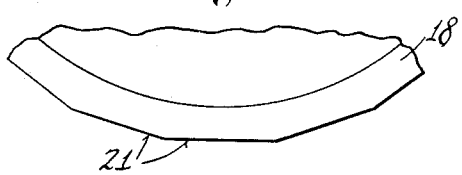
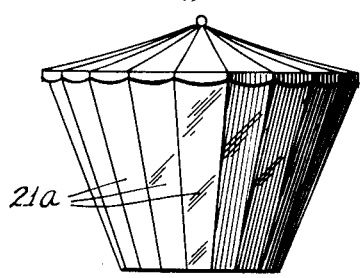
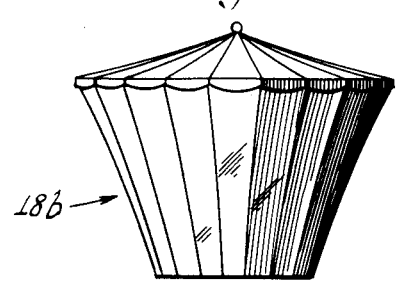
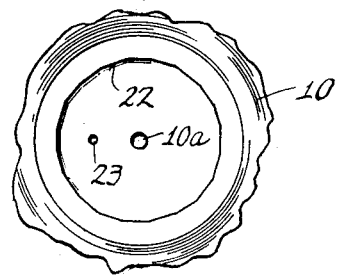
INVENTOR.
Porter S. Morgan
BY
Johnson and Kline
ATTORNEYS Oct. 11, 1960     P. S. MORGAN     2,955,509
REFLECTOR FOR PRAXINOSCOPIC DEVICES
Filed April 19, 1956     4 Sheets-Sheet 3
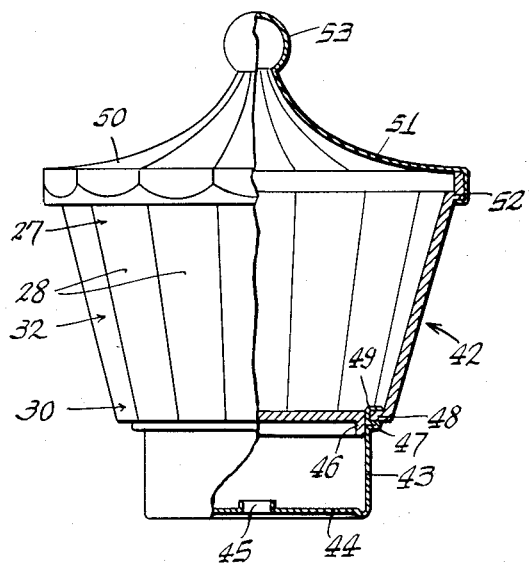
Fig. 9
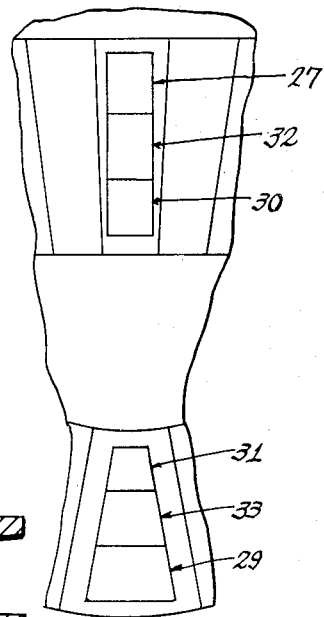
Fig. 16
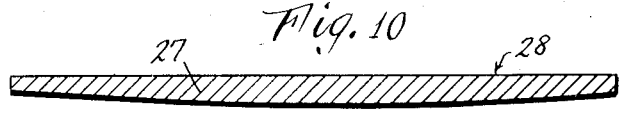
Fig. 10
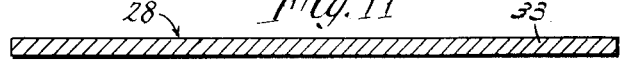
Fig. 11
Fig. 12
Fig. 13
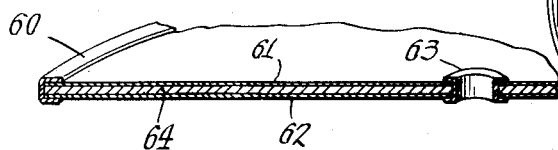
Fig. 17
INVENTOR.
Porter S. Morgan
BY
Johnson and Kline
ATTORNEYS Oct. 11, 1960   P. S. MORGAN   2,955,509
REFLECTOR FOR PRAXINOSCOPIC DEVICES
Filed April 19, 1956   4 Sheets-Sheet 4
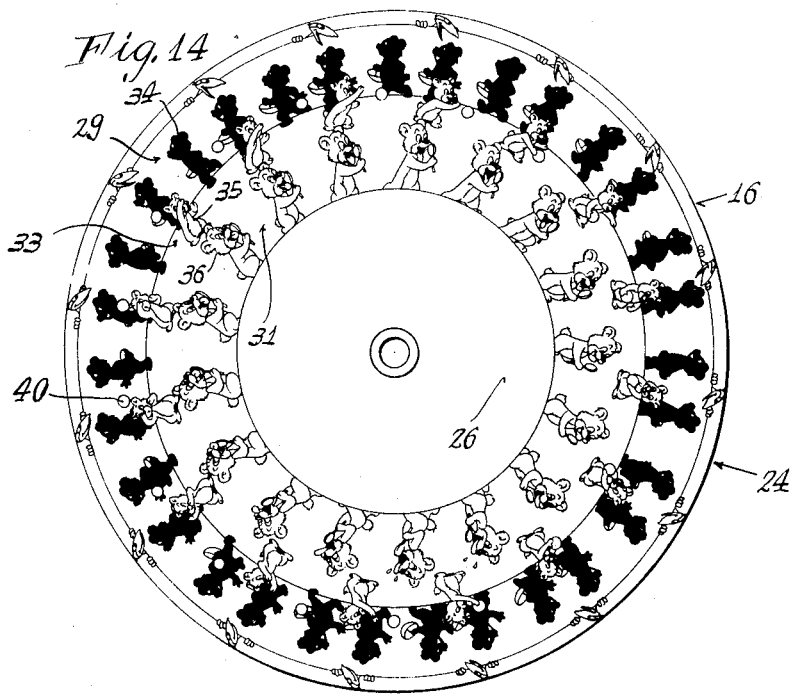
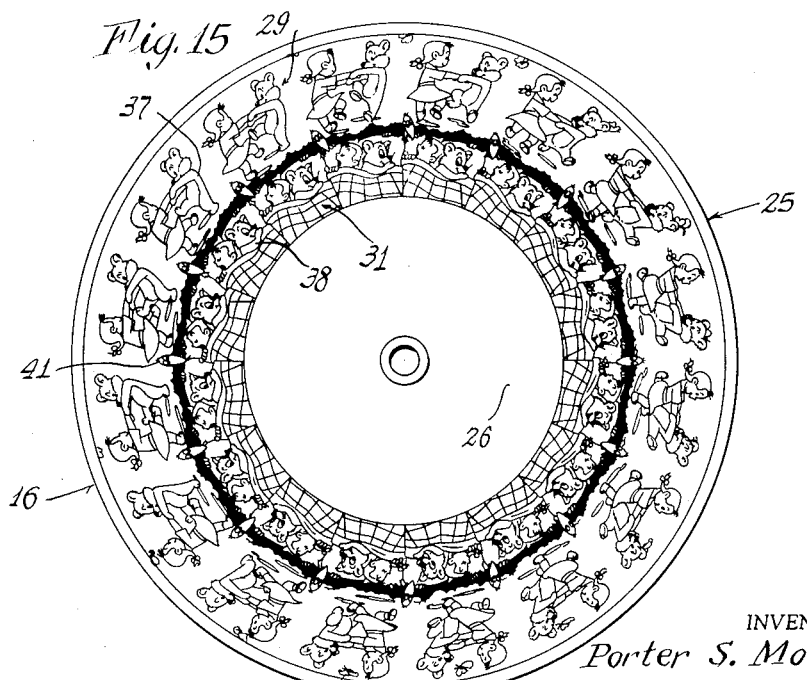
INVENTOR
Porter S. Morgan
BY
Johnson and Kline
ATTORNEYS United States Patent Office 2,955,509
Patented Oct. 11, 1960

2,955,509
REFLECTOR FOR PRAXINOSCOPIC DEVICES

Porter S. Morgan, Westport, Conn., assignor to Morgan Development Laboratories, Inc., Westport, Conn., a corporation of Delaware Filed Apr. 19, 1956, Ser. No. 579,234

7 Claims. (Cl. 88—16)

This application is a continuation in part of my copending application Serial No. 417,348, filed March 19, 1954, and relates to a picture reflecting device for use with a picture carrying disk of a praxinoscopic amusement device.

The present invention provides an arrangement whereby a showing of animated pictures may be combined with music or other audible sound produced by a phonograph record, preferably in synchronism, which is so simple that it can be used by any child sufficiently advanced to apply and remove disk records from a phonograph turntable, and so constituted that it can be employed on any existing phonograph without altering the construction thereof, and so economical that its cost is slight.

To this end this invention provides a phonograph record having on a face (or both faces) thereof a continuous succession of angularly spaced views in progressively changing attitudes of movement which may be related in kind and movement to the music or sound produced by the record, and a drum-like viewing device to be removably supported on the turntable supporting the record to be coaxial therewith, and having a circular succession of light reflecting mirror panels or other like surfaces by which the pictorial representations on the record may be viewed in animation, as the record and viewing device rotate, by reason of the praxinoscopic effect. The picture may be viewed from any angular position around the turntable in which there is no obstructing structure on the phonograph itself. No special light is necessary since any incidental light falling on the top surface of the record is readily picked up by the mirror panels and from the latter reflected to the eyes of the viewer.

By arranging the number of successive pictures with relation to the number of panels on the mirror, various effects may be had. For instance, if the number of pictures and number of panels is the same, the action is viewed as static, i.e., non-traveling. By increasing the number of pictures, the objects shown advance forwardly in the direction of rotation of the record and by decreasing the number of pictures, the objects move in the opposite direction. Thus, if the subject of the record is a march, the pictures can be arranged so that a succession of soldiers will appear to be marching past the point being viewed.

Preferably the viewing mirror structure covers only the center label-carrying part of the record and therefore does not limit the amount of sound-groove area normally used. The viewing mirror preferably has a bottom plate, which may be provided with friction material where it rests upon the record, and this plate has a central hole to slidingly fit over the end of the turntable shaft to centralize the mirror drum on the turntable.

The picture disk or picture carrying phonograph record has a continuous succession of angularly spaced pictures on its top side (and on both sides in a double-side record), the successive pictures depicting progressive changes in attitudes of movement. The pictures may be located in the sound-groove area of the record and thus do not interfere with or reduce the reproducing area. To avoid distortion of a true-drawn picture, regardless of the radial position thereof on the record, and to facilitate viewing the picture when the viewer's eye-level is low, say about even with the plane on the turntable, the mirror faces may be inclined outwardly. They may be flat or concavely curved longitudinally and may be flat or concave or convex transversely. Advantageously, the surface of each mirror panel is transversely convex at its upper end, blending to a flat in a midportion and concave at its lower end, in which case a radially wide band may be employed as the picture area and yet permit natural pictures to be clearly viewed without distortion regardless of the distance of any portion of the pictures from the portion of the surface of the mirror in which they are viewed.

The claims in this application are directed to the viewing mirror. Claims to the picture disk are presented in my copending application Serial No. 579,235, filed April 19, 1956, and the combination of the picture disk, mirror drum and means, such as a phonograph device, for rotating the disk and mirror are presented in my copending application Serial No. 417,348, filed March 19, 1954, of which this application is a continuation in part.

Other features and advantages will hereinafter appear.

In the accompanying drawings:

Fig. 3 is a vertical section taken through the viewing drum and record showing these parts supported on a phonograph turntable.

Fig. 4 shows a fragment of one form of the viewing drum in which the faces of the mirror panels are flat in their horizontal planes.

Fig. 5 is a view like Fig. 4 but showing the faces of the mirror panels concave in their horizontal planes.

Fig. 6 is an elevation of a viewing mirror in which the mirror panels incline outwardly as they extend upwardly.

Fig. 7 is a view like Fig. 6 but showing a viewing drum with the mirror panels inclined outwardly along a curve as they extend upwardly.

Fig. 8 is a fragmentary view of the central portion of a record made according to the present invention showing the polygonal recess for receiving the viewing drum and a locating hole in the picture disk for positioning the latter relative to the recess.

Fig. 9 shows an improved form of reflecting drum partly in elevation and partly in section.

Fig. 10 is a grossly exaggerated cross section of the convex upper portion of one form of mirror panel made according to the present invention.

Fig. 11 is a view similar to Fig. 10 showing a planar midportion of the mirror panel.

Fig. 12 shows the concave lower portion of the panel.

Fig. 13 is a bottom plan of the reflecting drum shown in Fig. 9.

Fig. 14 is a plan view of a picture-record disk having three rows of pictures.

Fig. 15 is a plan view of another picture-record disk, this having two major rows of pictures.

Fig. 16 is a diagram showing the effect of the curved mirror panel.

Fig. 17 is a fragmentary perspective view taken diametrically through a disk showing means for reenforcing the disk and protecting the edges of the laminated layers.

Figure 1:
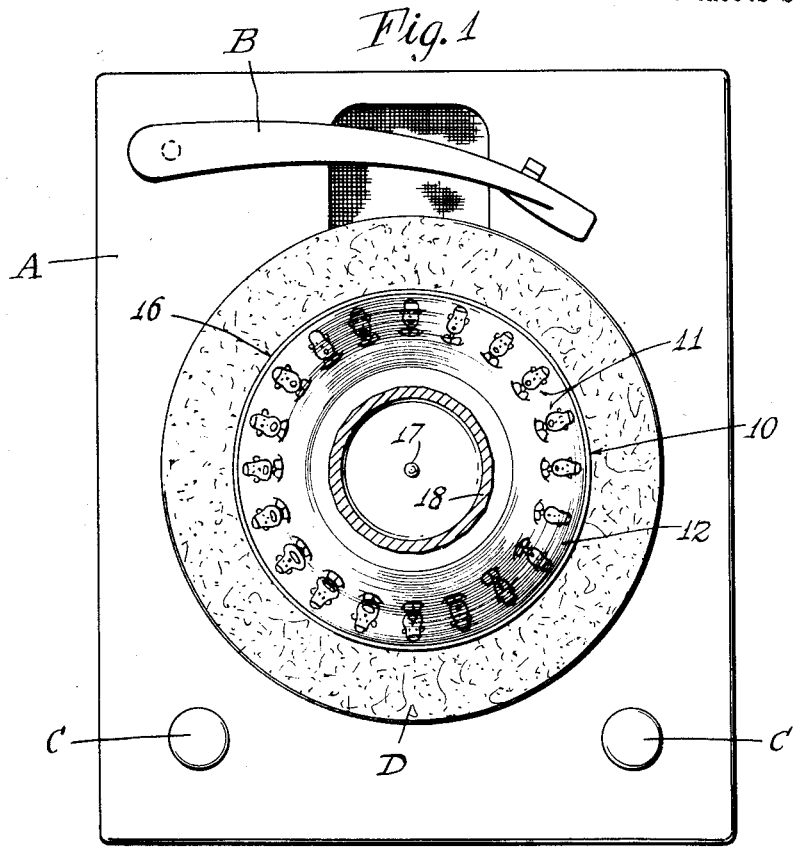
Figure 1 is a plan view of a phonograph showing my invention applied thereto.
Figure 2:
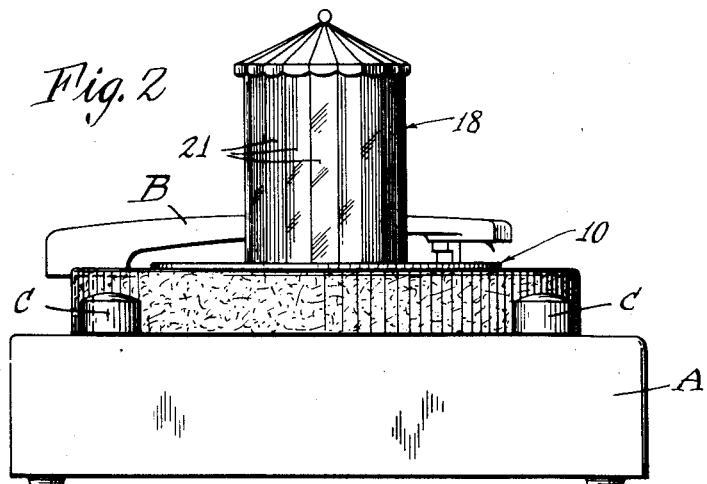
Fig. 2 is a front elevation of the parts shown in Fig. 1 with an ornamental cap on the viewing drum.

The disk-type phonograph shown in Figs. 1 and 2 may be of any suitable kind and construction. It has a casing A containing the usual parts such as a motor, amplifier, speaker, etc., a pickup arm B, controls C and a turntable D.

While the present invention is of general utility as an exhibitor, it is intended to supply added interest and pleasure over a mere sound reproducer to children of the nursery school age or younger, since it combines both sight and sound, usually in the form of music related to the subject or action of praxinoscopic pictures. For instance, the music of the march "Parade of the Wooden Soldiers" according to the present invention would have a new meaning for a young child when its playing is accompanied by action-pictures of wooden soldiers on parade.

For use by such young children, the device must of course be simple to operate. This need has been met by the present invention which, in addition to the phonograph record of this invention (which is no more difficult to use than ordinary disk records), requires only one part—a simple drum which can be placed on and removed from a record as easily as the record is placed on the turntable. As will appear below, both the record and the viewing drum can be made of plastic material so as to be virtually unbreakable by young children.

According to this invention, the phonograph record disk 10 may be made in any suitable manner to have a circular succession of pictures 11 angularly equispaced and depicting progressively changing attitudes of movement. To allow the pictures to be made as large as possible, the better to be viewed, the pictures may be placed near the periphery of the disk in the area of the sound track or groove 12 of the record. To permit this to be conveniently arranged the record is preferably made as a laminated plate, the action pictures 11 and other ornamentation being printed on a disk 13 of paper or cardboard over which is superposed a layer 14 of transparent plastic material, such for instance as Vinylite or cellulose acetate, which as molded contains the sound track 12. In the case of a two-sided record, which is usual, each side of the disk 13 carries pictures 11, and a layer 15 of plastic material is formed on the underside of the disk 13, the layers 14 and 15 preferably extending slightly beyond the periphery 16 of the disk 13, so that their peripheral edges may unite and seal-in the disk 13.

The sound tracks 12 are preferably formed as an incident to the molding of the layers 14 and 15.

The record disk 10 has a central hole 10a to receive the center post 17 of a phonograph turntable to axially align the disk and table.

The viewing of the pictures 11, as the turntable operates and the disk rotates, is accomplished by means of a reflecting drum 18 which, as shown, has a bottom 19 adapted to rest on the center or label-carrying portion of the record to rotate therewith, the bottom having an aperture 20 to receive the center post 17 of the turntable.

The viewing or reflecting drum 18 has a circular succession of mirror panels 21 in juxtaposed relation forming a polygonal outline. There is a determinate number of panels 21 and this is related to the number of pictures 11 on the record. The number of panels should be such as to give a smooth flow of images on the drum which, at the r.p.m. of the turntable to be used, avoids jerky movements as viewed.

When the reflecting drum 18 is placed on a record 10 as shown in Fig. 1 and the record and drum are rotated, light falling on the record will be picked up and reflected by the mirror panels 21 to the eyes of the viewer as each panel reaches a position substantially at right angles to the line of vision of the viewer, the optical image persisting as the drum rotates to bring the next and succeeding panels to such position according to the praxinoscopic principle.

In a traditional praxinoscope the action pictures and the reflecting drum are disposed in concentrically-spaced, substantially parallel planes and considerable special illumination is required to make the pictures discernible in the mirror drum. I have discovered, however, that excellent viewing results may be obtained when, as herein illustrated, the pictures lie in a plane at a substantial angle to that of the mirror panels; that is to say, when the pictures are in a horizontal plane, and the mirror panels are in a more or less vertical plane. When, as here, the pictures are in a horizontal plane, in a room with sufficient illumination for reading in the vicinity of the turntable, no additional illumination is necessary to observe the reflection of the action pictures carried by the record, the light present falling on the horizontal record being sufficient to make the reflected images clearly and easily seen.

At this point it should be noted that the pictures 11 are made in mirror-reverse when there is a right-hand or left-hand side to the picture and that the pictures are radially disposed with the bottoms of the pictures directed toward the center of the disk so that the pictures will appear in natural position as viewed on the mirror panels.

When the action to be depicted is within the picture itself as in the case of the pictures of a laughing clown as shown in Fig. 1, that is to say, when the subject is to appear immobile as a whole, there are as many pictures 11 on the record-disk as there are mirror panels on the drum. In this situation, substantial radial alignment of the pictures 11 with the mirror panels 21 is preferably maintained and this may be done when the drum is placed on the disk. If desired, however, the disk 10 may have a recess 22 of polygonal outline to receive and substantially fit the end of the reflecting drum (see Fig. 8). There may be a recess 22 on each side of the record and these may be formed when the record disk is being molded. To facilitate the accurate alignment of the recess 22 and the paper disk 13 the latter may be provided with an aligning hole 23 as shown in Fig. 8 which cooperates with an aligning pin on the molding die.

When the action depicted is to be mobile, as in the case of successive leaping animals or parading soldiers, if the action is to proceed in the direction of turntable rotation, i.e. to the left of the viewer, there will be one more picture 11 than there are mirror panels, so that in each successively appearing picture the moving object will appear nearer to the leading edge of the mirror panel and will gradually disappear therefrom as another similar picture appears at the trailing edge of the panel. If the action is to proceed counter to the direction of rotation of the record, i.e. to the right of the viewer, there will be one less picture 11 than mirror panels.

The reflecting drum 18 may be made in any suitable manner. For instance, it may be made of metal having polished mirror panels or it may have a body to which glass mirrors are attached. However, for economy and convenience, it is preferable to mold the drum 18 as one piece of opaque plastic material. If the molding is performed with polished vacuum molds and opaque material is used the surfaces of the panels 21 can have highly reflective surface mirrors. Such drums are light in weight and virtually unbreakable, both important features where young children are concerned.

When, as shown in Fig. 1, the mirror panels 21 are located perpendicular to the record the eye-level of the child or other person must be substantially above the plane of the record disk to satisfactorily observe the pictures in the reflecting drum. This would require that the turntable be placed quite low for small children. To avoid this, the drum can be so formed that the panels incline upwardly and outwardly, as shown in Fig. 6. The panels 21a may be substantially flat in a vertical plane but extend outwardly and upwardly. I have found that when the panels are inclined approximately 22½ degrees from the perpendicular, all portions of the action pictures may be clearly seen when viewed with the eye-level of the observer slightly above the plane of the disk. However, a more convenient vantage point seems to be somewhere between these extremes and hence it is preferable to have the mirror panels form an angle of about 15 degrees from the vertical such as shown in Fig. 9.

If desired, the drum, as in the case of the drum 18*b* shown in Fig. 7, may have the mirror panels concavely curved as they extend outwardly and upwardly, the chord of the arc formed by the curve being about that which would be chosen for a vertically flat panel. When the panels are so curved, the image of the picture will be enlarged as seen by the observer.

The panels 21 may be concavely curved in a horizontal plane as shown in Fig. 5 and when this is done, the reflected image will be enlarged horizontally. Hence, by curving the panels 21 both vertically and horizontally, the reflected image from the action pictures may be enlarged in natural form.

It is within the scope of this invention to attenuate or foreshorten the pictures 11 either in height or in width, so that when reflected by the reflecting drum the image will appear natural. However, since the circular succession of pictures 11 in and of themselves may have considerable interest and amusement value when observed directly, as when the record is held in the hands of a child, it is preferable that the pictures be true and undistorted views and this can be accomplished according to the present invention as pointed out below.

In the above description, reference was had particularly to the disk shown in Fig. 1 in which the pictures are located in a single rather narrow marginal band near the periphery of the disk. When, however, as shown in Figs. 14 and 15, the pictures on the disks 24 and 25 respectively are arranged in a plurality of annular rows which occupy a wide band extending from the periphery 16 of the disk to the center portion 26 that is usually occupied by the label where the reflecting drum is located, there is the problem of avoiding noticeable distortion of the reflected images, particularly in the case of static or nontraveling pictures. This is because of the wide variation in the arcuate lengths in the radially spaced portions of the segmental picture area in front of a mirror panel, the arcuate length or width of the picture area increasing outwardly from the center portion 26 of the disk to the periphery 16. The problem is aggravated when the reflecting mirror has its panels inclined upwardly and forwardly, as is desirable, because the panels also vary in width from the lower portion of the panel to the upper portion thereof.

According to the present invention this problem can be solved by: (1) drawing the pictures in distorted form to compensate for the variations; (2) transversely curving the reflecting surface of the mirror panel to produce a lens effect and optically modify the effective widths of the panel and picture segments in which case the reflected image of the picture will be the same as the pictures on the disk which may have natural form; or (3) having the pictures somewhat distorted and optically modifying the mirror panels to some extent.

If it is decided to distort the pictures, the pictures must be reduced in width from the periphery of the disk inwardly to the mirror drum. This is a difficult task and requires considerable artistic skill and imagination, but it is entirely possible to do this, but the cost of producing the pictures might be prohibitive.

If it is desired that the pictures on the record disk, when viewed directly, be natural in appearance, the panel is shaped as illustrated in Figs. 10 and 11, wherein the upper portion 27 of each mirror panel 28 is convex so that the outer portion of the segmental picture area 29 directly in front of the mirror panel will be optically narrowed. This is illustrated on a grossly enlarged scale in Fig. 10. The lower end 30 of the mirror panel is made concave, as indicated in Fig. 12, so that the inner portion 31 of the picture area is optically enlarged. The surface of the mirror is flat as in Fig. 11 at a determinate midportion 32 of the mirror panel where neither enlargement nor reduction is required of the images reflected from central portions 33 of the picture area. The convex portion 27 and concave portion 30 of the mirror gradually decrease in curvature from the ends of the panel toward said midportion 32 so as to there become flat or planar transversely.

The result is that the radial lines forming the sides of the segmental picture area 29 are optically brought into substantial parallelism as reflected in the mirror panel.

Not only does this arrangement permit the pictures to be drawn in more natural form, but it also assures that each reoccurring reflected image appearing on the mirror panels will register in the eyes of the viewer when the mirror panel lies transversely to the line of vision of the observer.

As stated above, in the broader aspects of this invention the distortion of the reflected image may be avoided by both optically modifying the image and distorting the picture to be reflected. This may be advantageous in a situation where for economy sake a mirror which is simply convex throughout its length is used. This would reduce the extent to which the pictures would have to be distorted, especially at the outer portion of the disk, although the picture nearer the center of the disk would be drawn with greater distortion.

Usually, the mirror drum is set on the picture disk so that the vertical center line of a mirror panel and the radial center line of the picture group are substantially aligned, and this is particularly advantageous when viewing static or nontraveling pictures. However, this alignment is not necessary and, in fact, this condition does not prevail where, in order to indicate traveling movement of a subject shown in the pictures, there is a greater or lesser number of picture groups than there are panels on the mirror.

It is to be understood that the recording, when the disk is a record, will usually be related to the picture material and that the action in the picture may be in synchronism with the rhythm of the music, hence one or more cycles of movement will usually be completed in each revolution of the record. When the recording is properly made and the pictures properly drawn, the desired synchronism cannot be disturbed since the layers 14 and 15 and the picture disk become as one after the record is molded. The aperture 23 in the picture disk may advantageously be employed to predeterminately position the picture disk 13 in the molding dies to assure its proper position relative to the sound track.

While, as illustrated herein, the number of pictures is equal or substantially equal to the number of panels, since the reflecting panels are the optimum distance from the pictures, the pictures may be differently placed and may be different in numbers. For instance, with a reflecting drum having a radius of about one and a quarter inches and twenty (20) panels, if the pictures were spaced say four inches from the axis of the record, only sixteen (16) pictures would be required, the pictures being so positioned around the record that in static condition a complete picture image may appear on two adjacent mirror panels.

The pictures on the disks may, of course, relate to any desired subject whatever. For instance, as shown in Fig. 14, there are three rows or bands of pictures 34, 35 and 36 radially spaced, while in Fig. 15 there are only two rows or bands of pictures 37 and 38.

When the subject of a picture or scene is to travel in the direction of rotation of the disk, the number of pictures will be one or more greater than the number of mirror panels. In Fig. 14, for instance, there are seventeen pictures 36 in the inner portion 31 for the sixteen panel drum. When the picture is to be static, that is, not traveling either backwardly or forwardly with reference to the direction of rotation of the disk, there are the same number of pictures as mirror panels, as in the case of midportion 33 of Fig. 14 in which there are sixteen pictures 35, one for each mirror panel. When the motion is to be shown traveling counter to the direction of rotation of the disk, the number of pictures is one or more less than the number of panels, and hence if ordinary motion was to be indicated in the outer portion 29 there could be fifteen pictures for sixteen mirror panels.

However, according to the present invention, the traveling motion of the pictures in any row may be slowed down by having approximately twice as many pictures as mirror panels. For instance, as shown in Fig. 14, there are in the outer portion 29 thirty-one pictures 34 for the sixteen mirror panels. Since there are approximately twice the number of pictures 34 in substantially duplicate pairs, the motion is slowed down to half speed and since there are only thirty-one pictures, one less than twice the number of panels and the movement of the figures proceeds counter to the direction of rotation of the disk. If there were thirty-three pictures 34, the traveling motion would be in the direction of rotation of the disk and the figures in the picture 34 would face in the opposite direction to appear natural. In Fig. 15 there are two rows of pictures and each contains sixteen pictures, the action being contained within the pictures, i.e. static. For instance, in outer portion 29 the pictures 37 of the girl and bear will appear as dancing in one place without moving off the scene. In the inner portion 31, the pictures 38, the child's head and bear's head showing over the bed-covering will remain nontraveling but will show action as, for instance, the bear moving its head and the child yawning.

Incidental objects may be depicted in any of the rows such as the pictures 39 of a butterfly in the outer portion 29 in Fig. 15. There may be any arbitrary number of such incidental pictures and they are not necessarily included in each panel. For instance, the pictures 39 of the butterfly give the illusion of the butterfly flying in and out of the scene. A similar effect is produced in the midportion 33 in Fig. 14, where the pictures 40 of the ball are so spaced in successive picture segments as to show the ball being tossed from one bear to another in the row. There being eighteen pictures 40 of the ball, the appearance is given of the ball traveling over the head of one of the bears in the direction of rotation of the disk.

Further, as shown in Fig. 15, there may be other pictures such as the pictures 41 of the bird's head and these may be located between the inner and outer portions of the picture segment. In Fig. 15 there is the same number of pictures 41 as panels and therefore the head of the bird does not appear to travel but merely moves from side to side.

While a picture disk may have all mobile pictures or all static pictures, a much more attractive showing is had when mobile and static pictures are combined, since in this way the illusion of animation is greatly enhanced.

The reflecting drum may be made as shown in Figs. 2 and 3 so that the mirror panels terminate adjacent the record-picture disk, or as shown in Fig. 9 in which the lower ends of the panels are spaced from the disk. In Fig. 9, the molded plastic drum 42 may be mounted on a sheet metal base 43 which has a bottom 44 which rests on the turntable and which has a hole 45 to receive the centering pin 17 on the turntable. The base 43 telescopes with a flange 46 on the plastic drum, while a flange 47 on the base engages the bottom 48 of the drum. Tabs 49 on the base extend through slots in the bottom 48 and are bent over to unite the base and the drum. The open upper end 50 of the drum 42 is closed by an ornamental sheet metal cover 51, the lower end of which is clinched over a flange 52 on the drum. The cover has a knob 53 by means of which the reflecting drum may be handled in applying it to and removing it from a record disk.

As stated above and as shown in Fig. 1, the picture disk may comprise a piece of paper 13 having laminated therewith upper and lower layers 14 and 15 of transparent plastic material, and when the picture disk is also a phonograph record the sound grooves are formed in these plastic sheets.

It has been found difficult to seal the edges of the plastic layers and the paper disk, and it has also been found that the sealed edge tends to chip and is occasionally rather sharp.

To avoid this, the present invention provides, as shown in Fig. 17, for protecting the periphery of the disk. This is done by providing a binding 60 around the edge of the disk. This binding may be of any suitable material but it has been found that a thin metal channel piece adequately serves the purpose.

The binding 60, since it overlies the surface of the plastic disks 61 and 62, serves a further purpose of keeping the surfaces of two adjacent disks out of contact and therefore prevents abrasion and attrition when the disks are stacked one upon the other. These advantages are further increased by providing an eyelet 63 extending through the central hole of the disk and overlying the outside surfaces of the disks 61 and 62.

Another important advantage obtained by providing the stiff binding 60 around the periphery of the laminated disk is that it prevents warping of the disk from its desired flat condition, and it also permits the use of a heavier cardboard picture disk such as the disk 64, Fig. 17, and thinner plastic disks 61 and 62 which not only effects a saving in cost but also permits the plastic disks to be more transpicuous.

Variations and modifications may be made within the scope of the claims and portions of the improvements may be used without others.

I claim:

1. A reflecting drum for a praxinoscope device comprising a molded plastic drum having a plurality of juxtaposed panels on the peripheral surface, said panels extending upwardly and outwardly and having a polished mirror-like finish, said drum having a depending sleeve concentric with the axis of the drum, and a base having upwardly extending side walls connected to the drum to support the drum in reflecting position, said side walls engaging the depending sleeve to locate the base on the drum.

2. A reflecting drum for a praxinoscope device comprising a molded plastic drum having a plurality of juxtaposed panels on the peripheral surface, said panels extending upwardly and outwardly and having a polished mirror-like finish, said drum having apertures in the base and a depending sleeve concentric with the axis of the drum, a sheet metal supporting base having a central aperture and upwardly extending side walls, and means for connecting said base to said drum comprising bendable tongues extending through and interlocked with said base to support the drum in raised reflecting position, said side walls engaging the depending sleeve to locate the base on the drum.

3. A reflecting drum for a praxinoscopic device having a base for removably supporting it on the turntable for rotation therewith and having a continuous succession of juxtaposed elongate light-reflecting panels extending upwardly from the base and forming a polyhedral outer surface of the drum, each panel being wider at the top than at the bottom and extending upwardly from the base and outwardly from the axis of the drum, the exposed surface of each panel being transversely convex at the upper end of the panel with the radius of curvature increasing gradually from said one end of the panel to a point at a determinate distance from said end of the panel.

4. A reflecting drum for a praxinoscopic device having a base for removably supporting it on the turntable for rotation therewith and having a continuous succession of juxtaposed elongate light-reflecting panels extending upwardly from the base and forming a polyhedral outer surface of the drum, each panel being wider at the top than at the bottom and extending upwardly from the base and outwardly from the axis of the drum, the exposed surface of each panel being transversely convex at the upper end of the panel with the radius of curvature increasing gradually from said one end of the panel to an intermediate portion of the panel in which the surface is substantially flat.

5. A reflecting device for a praxinoscope comprising a drum having on its peripheral surface a plurality of elongate juxtaposed light-reflecting panels extending upwardly and outwardly at an angle to the perpendicular preferably in the order of 15°, each of said panels having at least a substantial portion thereof convex in transverse cross section, said drum having a cylindrical base portion to elevate the panels substantially above a surface on which the drum is to be supported, the base portion having a central aperture to receive a locating device, and the top of the drum having a fingerpiece whereby the drum may be applied to and lifted from a supporting surface without the necessity of touching the reflecting panels.

6. A reflecting device for a praxinoscope comprising a hollow drum of plastic material having molded on its periphery a plurality of elongate juxtaposed light-reflecting panels, the panels extending upwardly and outwardly at an angle to the perpendicular preferably in the order of 15°, each of said panels having at least a substantial portion convex in cross section, said drum being closed at its lower end and having secured thereto a cylindrical base portion to elevate the panels substantially above a surface on which the drum is to be supported, the base portion having a central aperture to receive a locating device and a cover plate for the upper end of the drum.

7. A reflecting drum for a praxinoscopic device having a base for removably supporting it on a turntable for rotation therewith and having a continuous succession of juxtaposed elongated light-reflecting panels extending upwardly from the base and forming a polyhedral outer surface of the drum, each panel being wider at the top than at the bottom and extending upwardly and outwardly from the axis of the drum, the exposed surface of each panel being transversely convex at the upper end of the panel with the radius of curvature increasing gradually from said one end of the panel to an intermediate portion of the panel in which the surface is substantially flat and the surface of the panel from said intermediate portion to the lower end of the panel is concave, the radius of curvature decreasing substantially from infinity to a predetermined radius at the adjacent end of the panel, said reflecting drum being adapted to be used with a picture disk having picture portions displaced over a wide band at the outer portion of the disk and the radius of transverse curvature of the panel at various portions along the length thereof being such as to compensate for the differences in arcuate spacing between picture portions closer to or farther from the respective portions of the surface of the panel.

References Cited in the file of this patent

UNITED STATES PATENTS

| | | |
|---|---|---|
| 884,217 | Schuessler | Apr. 7, 1908 |
| 887,716 | Xander | May 12, 1908 |
| 1,895,239 | Venzie | Jan. 24, 1933 |

FOREIGN PATENTS

| | | |
|---|---|---|
| 4,244 | Great Britain | 1877 |
| 609,967 | Great Britain | Oct. 8, 1948 |

OTHER REFERENCES

Living Pictures, Hopwood, published by The Hatton Press, Limited, London, 2nd ed., 1915, pages 31 and 33.

Animated Cartoons, Lutz, E. G., text published by Chapman & Hall Ltd., London, 1920, pages 28, 29.